United States Patent
Stark

(10) Patent No.: US 9,764,849 B2
(45) Date of Patent: Sep. 19, 2017

(54) METHOD OF ATTACHING NACELLE STRUCTURE TO MINIMIZE FATIGUE LOADING

(71) Applicant: The Boeing Company, Chicago, IL (US)

(72) Inventor: Richard L. Stark, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 551 days.

(21) Appl. No.: 14/489,782

(22) Filed: Sep. 18, 2014

(65) Prior Publication Data

US 2016/0251085 A1    Sep. 1, 2016

(51) Int. Cl.
   *B64D 29/06*    (2006.01)
   *B64D 33/02*    (2006.01)
   *B64D 29/00*    (2006.01)

(52) U.S. Cl.
   CPC ............ *B64D 29/06* (2013.01); *B64D 29/00* (2013.01); *B64D 33/02* (2013.01)

(58) Field of Classification Search
   CPC B64D 29/06; B64D 29/08; B64C 1/12; F02C 7/20; F02C 7/04; F05D 2250/184
   See application file for complete search history.

(56) References Cited

U.S. PATENT DOCUMENTS

| | | | | |
|---|---|---|---|---|
| 5,297,760 A * | 3/1994 | Hart-Smith | ............. | B64C 1/068 244/131 |
| 6,042,055 A * | 3/2000 | Messinger | ................ | B64C 1/38 244/131 |
| 6,328,258 B1 * | 12/2001 | Porte | ...................... | B64D 29/06 244/53 B |
| 7,210,611 B2 * | 5/2007 | Sanders | ............... | B21D 26/055 228/112.1 |
| 7,850,387 B2 * | 12/2010 | Chapin | ..................... | B64C 1/12 403/286 |
| 9,126,670 B2 * | 9/2015 | Thable | ..................... | B64C 1/069 |
| 9,126,672 B2 * | 9/2015 | Storozuk | ............... | B64C 1/1446 |
| 9,139,306 B2 * | 9/2015 | Porte | ..................... | B64D 33/02 |
| 9,145,195 B2 * | 9/2015 | Burvill | ..................... | B64C 1/12 |
| 2005/0046186 A1 * | 3/2005 | Drescher | ............... | F16L 37/252 285/330 |
| 2007/0016336 A1 * | 1/2007 | Chapin | ..................... | B64C 1/12 701/1 |
| 2008/0034759 A1 | 2/2008 | Bulman | | |
| 2009/0134275 A1 * | 5/2009 | Hackius | ................. | B23K 26/24 244/117 R |
| 2011/0197973 A1 * | 8/2011 | Binks | ..................... | B64D 29/08 137/15.1 |

(Continued)

FOREIGN PATENT DOCUMENTS

DE   102011106964 A1   1/2013
EP          1607682 A1   12/2005

(Continued)

*Primary Examiner* — Joseph W Sanderson
(74) *Attorney, Agent, or Firm* — Felix L. Fischer

(57) ABSTRACT

A structural system for accommodating the thermal expansion of a nacelle lip skin and supporting structure has a lip skin and a first angle element attached to the lip skin. The first angle element has a free edge that is scalloped to accommodate thermal stresses. A bulkhead is attached to the first angle element.

20 Claims, 9 Drawing Sheets

(56) References Cited

U.S. PATENT DOCUMENTS

| | | |
|---|---|---|
| 2012/0135200 A1 | 5/2012 | Burvill |
| 2013/0032669 A1* | 2/2013 | Porte .................... B64D 33/02 244/131 |
| 2013/0084422 A1* | 4/2013 | Thable ................... B64C 1/069 428/137 |
| 2014/0064927 A1* | 3/2014 | Binks .................... B64D 29/08 415/119 |
| 2015/0225065 A1* | 8/2015 | Brunner ................. B64C 1/12 244/131 |
| 2015/0260104 A1* | 9/2015 | Wilson .................. B64D 29/06 60/796 |

FOREIGN PATENT DOCUMENTS

| | | | |
|---|---|---|---|
| EP | 2034135 A2 | 3/2009 | |
| EP | 2034136 A2 | 3/2009 | |
| EP | 2241504 A2 | 10/2010 | |
| FR | 2914955 A1 | 10/2008 | |
| FR | 3026134 A1 * | 3/2016 | ............. B64D 29/06 |

* cited by examiner

METHOD OF ATTACHING NACELLE STRUCTURE TO MINIMIZE FATIGUE LOADING

REFERENCES TO RELATED APPLICATIONS

This application is copending with application Ser. No. 14/214,723 filed on Mar. 15, 2014 entitled ONE PIECE INLET LIP SKIN DESIGN having a common assignee with the present application, the disclosure of which is incorporated herein by reference.

BACKGROUND INFORMATION

Field

Embodiments of the disclosure relate generally to aircraft structures and more particularly to embodiments for an inlet skin attachment to a supporting bulkhead having mismatched coefficients of thermal expansion.

Background

Current aircraft structures for nacelle and engine cowlings employ skin elements stiffened with attached structural frames having a desired cross section for necessary support of the skin. Lip skins are critical aerodynamic surfaces and it is generally understood that a long lip skin is advantageous to preclude the necessity for a joint with the outer barrel far forward where disruption of the laminar flow region of the lip skin may occur. In many designs the distance between the forward bulkhead outer attachment and the lip skin to outer barrel attachment is quite long. Aerodynamic heating as well as altitude temperature differentials during flight profiles of an aircraft affects the thermal condition of the lip skin and associated support structure. Design and fastening of circumferential stiffeners around the lip skin must take into account thermal expansion of the lip skin and stiffeners. A primary load is generally created by the radial growth of the round nacelle structure and the related circumferential loads due to the substantially circular cross section and differing coefficient of thermal expansion (CTE) between the lip skin and structural elements. Repetitive thermal cycling during flight operations may result in fatigue loading.

It is therefore desirable to provide structural integration for the lip skin and bulkhead attachment that accommodates CTE mismatch and avoids thermally induced fatigue.

SUMMARY

Exemplary embodiments provide a structural system for accommodating the thermal expansion of a nacelle lip skin and supporting structure, the structural system having a lip skin and a first angle element attached to the lip skin. The first angle element has a free edge that is scalloped to accommodate thermal stresses. A bulkhead is attached to the first angle element.

A method for fabricating the embodiments described is enabled wherein a lip skin and a first angle element having a free edge are formed. The free edge is scalloped and a bulkhead is attached to the lip skin with the first angle element.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide a structure for accommodating CTE mismatch between a skin element and underlying support structure. As an exemplary embodiment, a lip skin and supporting structure in an engine cowling lip for a large multiengine aircraft is disclosed. An exemplary lip skin may be formed by aluminum spinning and machining or comparable methods. The lip skin is interconnected to an outer barrel of the engine inlet at the aft edge land on an outer circumferential rim and on an inner edge land on an inner circumferential rim. A forward bulkhead extends between a central land and the inner edge land. Angled attachment elements are employed to attach the forward bulkhead at both the central land and inner edge land. One or both of the angled attachment elements includes a scalloped free edge for enhanced management of thermal expansion by the lip skin and attachment elements which may create structural loads due to mismatched CTE. The interconnection of the aft edge land and outer barrel may be accomplished with a T-chord and an inner barrel of the engine inlet is interconnected to the inner edge land. An inner flange on the forward bulkhead is employed to span the inner edge land and a companion forward edge land (mating surface) on the inner barrel. For exemplary embodiments the inner barrel may be a multiple ply laminate. An aft bulkhead extends between an aft end of the outer barrel and inner barrel.

Figure 1:
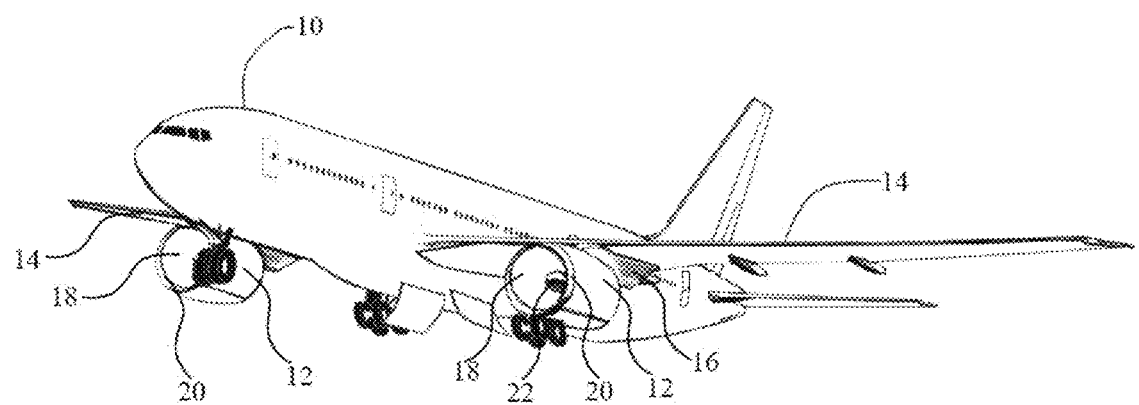
FIG. 1 is a pictorial view of an example aircraft on which the present embodiments may be employed.
Figure 2:
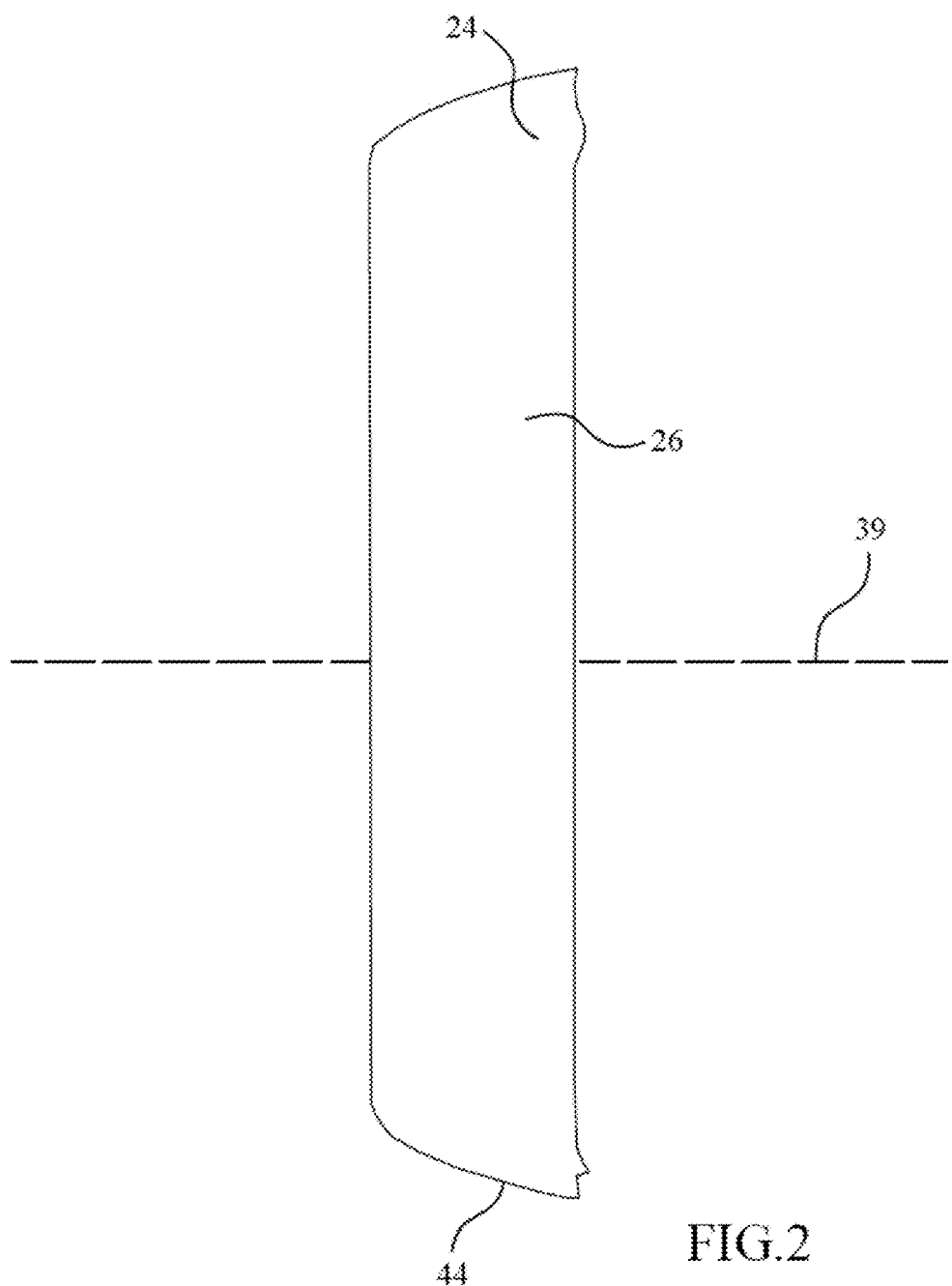
FIG. 2 is a side view of the lip skin.
Figure 3:
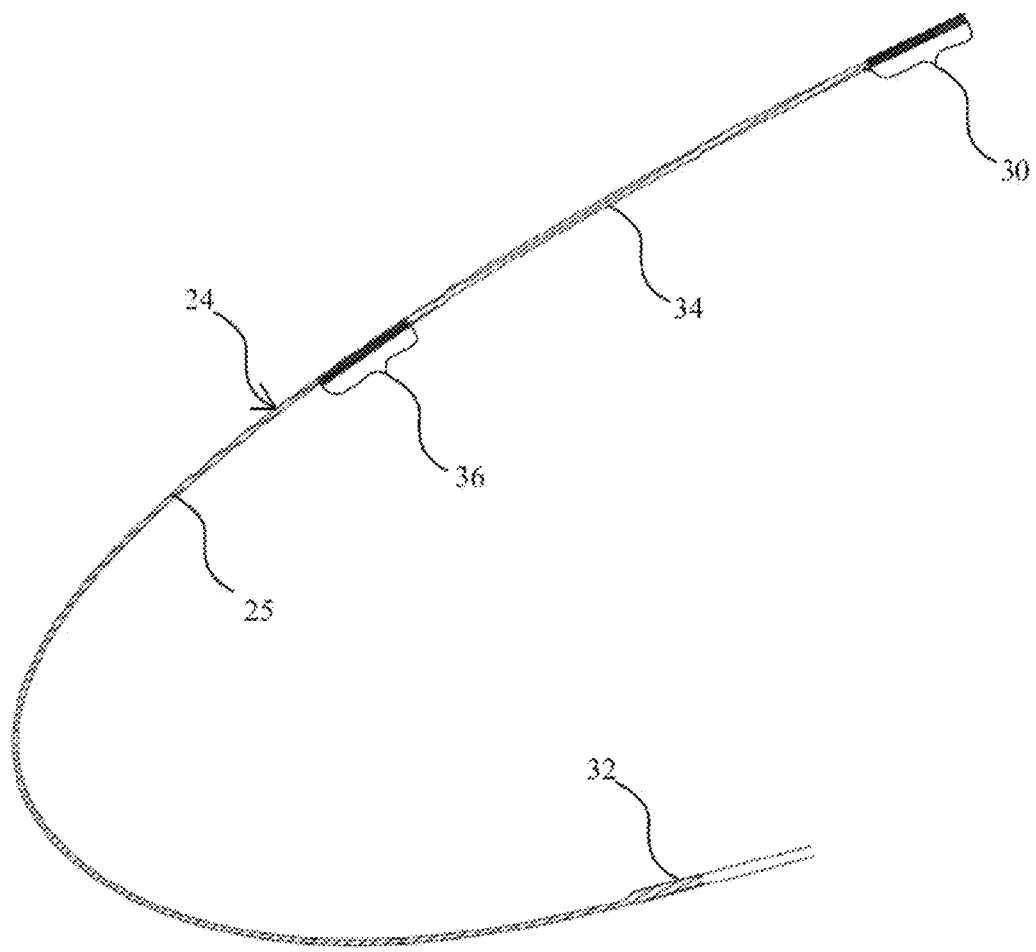
FIG. 3 is a side detailed section view of the lip skin.

Referring to the drawings, FIG. 1 shows an example aircraft 10 on which the embodiments disclosed herein may be employed. For the example shown, the aircraft 10 has two engine nacelles 12 supported from the wings 14 by pylons 16. Each nacelle 12 has an inlet aperture 18 surrounded by a lip 20 providing an aerodynamic leading edge for the inlet for a turbofan engine 22. The external surface of the lip 20 is provided by a lip skin 24. The lip skin 24 is shown in FIGS. 2 and 3. The lip skin 24 has an outer rim 26 and an inner rim 28.

As seen in FIG. 3 the lip skin 24 terminates at the outer rim 26 in an aft edge land 30 which extends substantially around the rim. The lip skin 24 terminates at the inner rim in an inner edge land 32. A central land 36 extends around the circumference of the lip skin 24. To provide longitudinal stiffness, stiffeners extending substantially fore and aft, interengaged with the aft edge land 30 and central land 36 may be employed to provide stiffness in the lip skin 24 sufficient for aerodynamic loading of the lip skin and to provide sufficient strength for a "step zone" on the upper surface of the lip skin. The aft edge land 30, inner edge land 32, and central land 36 are integral to the lip skin 24.

Figure 4:
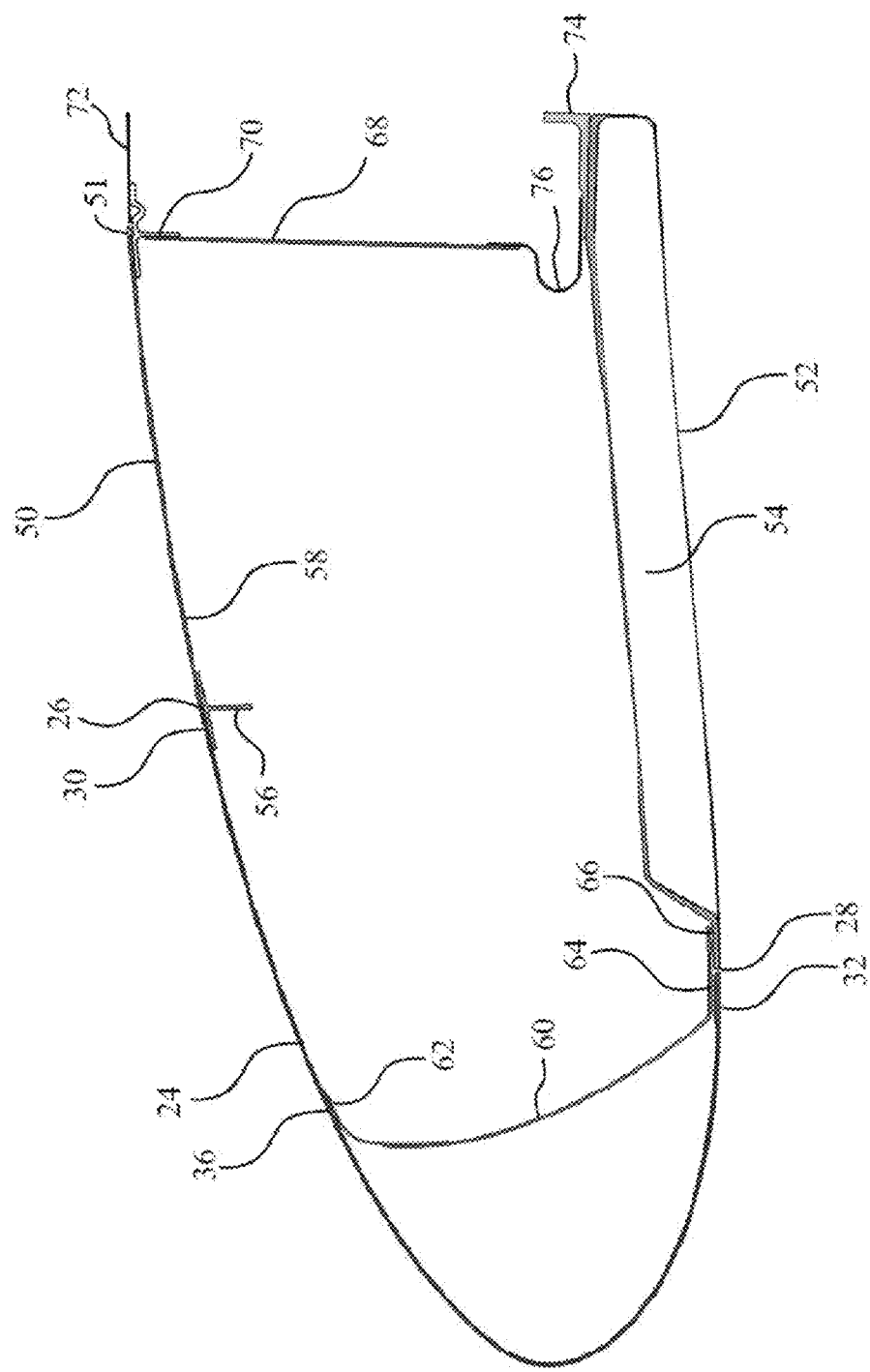
FIG. 4 is a section view of the lip skin as assembled to the outer barrel of the engine inlet structure.

The lip skin 24 is assembled as a portion of the inlet of the nacelle 12 as shown in FIG. 4. Outer rim 26 of the lip skin 24 is abutted against a forward edge of an outer barrel 50 while the inner rim 28 is abutted against a forward edge of an inner barrel 52. For the embodiment shown, inner barrel 52 is a multiple laminate structure with a core 54. A circumferential T-chord stringer 56 is employed to engage the aft edge land 30 and an inner surface 58 of the outer barrel 50. A forward bulkhead 60 is attached to the central land 36 with an outer angle element 62 that is attached to or integral with the bulkhead an outer diameter. An inner angle element 64 attached to or integral with the forward bulkhead 60 at an inner diameter connects the forward bulkhead to the lip skin 24 and, for the embodiment shown, spans and interconnects the inner edge land 32 and a mating surface 66 on the inner barrel 52 extending aft from a forward edge. An aft bulkhead 68 extends between the outer barrel 50 and inner barrel 52. A T-V chord stringer 70 is employed to join an aft edge of 51 the outer barrel 50, aft bulkhead 68 and an external nacelle skin 72. The inner barrel 52 is attached to internal nacelle structure, having similar design to prior art nacelles, with an L bracket 74. A beaded inner attach angle 76 is employed to connect the aft bulkhead 68 to the L bracket 74.

Figure 5:
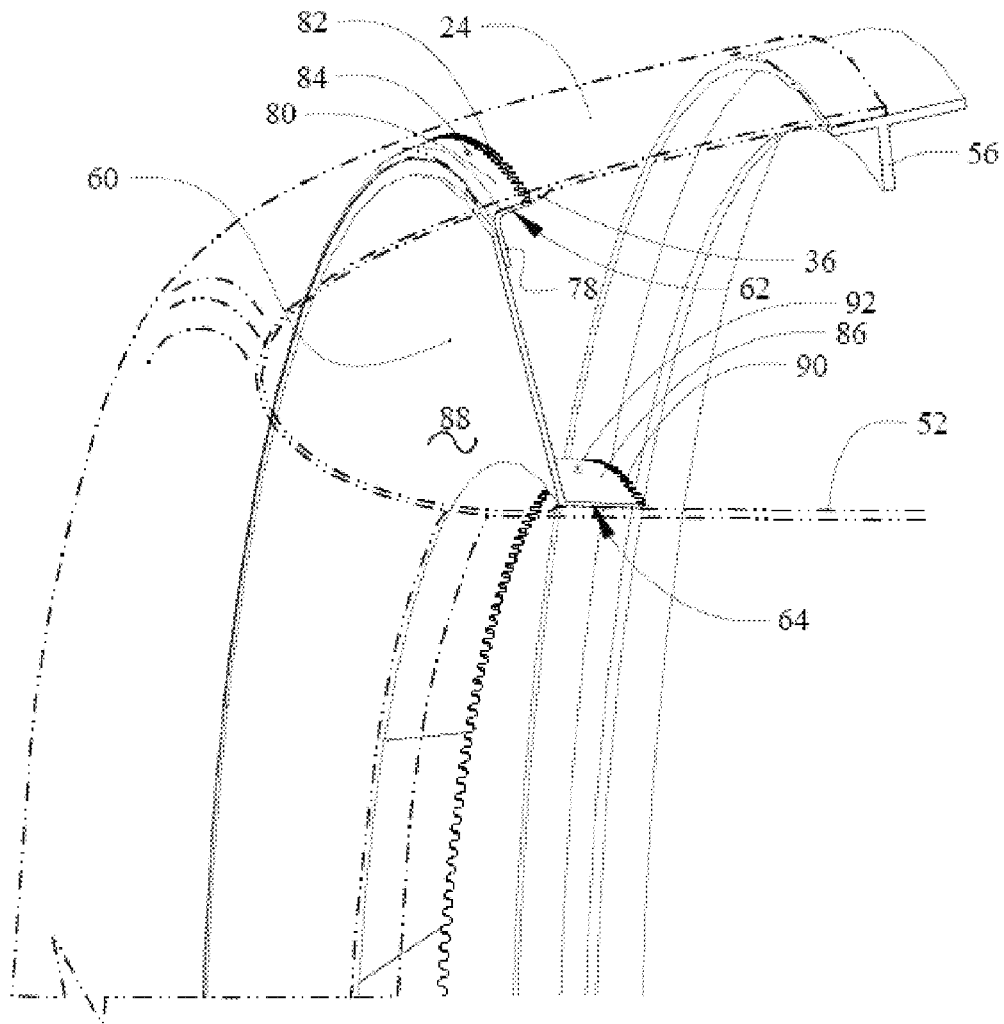
FIG. 5 is a detailed partial section pictorial view of the lip skin and bulkhead assembly with the lip skin shown in phantom for viewing of the underlying structure.

As seen in FIG. 5, the outer angle element 62, for the embodiment shown, is a separate angle attached to the forward bulkhead 60. A radially extending leg 78 of the outer angle element 62 is attached to the bulkhead 60 using fasteners or adhesives. In alternative embodiments, the outer angle element may be integral to the bulkhead 60. The radially extending leg 78 of the outer angle element 62 extends circumferentially from the bulkhead 60 terminating at an outer longitudinal flange 80. The lip skin 24 is attached circumferentially to the outer longitudinal flange 80 at central land 36. The lip skin 24, outer angle element 62 (and attached bulkhead 60) have differing CTEs and therefore will have potentially differing expansion under temperatures experienced in the flight profile of the aircraft. The outer longitudinal flange 80 has a longitudinal free edge 82 shown in detail in FIG. 6. The longitudinal free edge 82 incorporates a scalloped profile (exaggerated in the drawings to clearly show the feature) to ameliorate stresses from thermally induced expansion differential between the outer angle element 62, the attached bulkhead 60 and the lip skin 24. The lip skin 24 is attached to the outer longitudinal flange 80 using mechanical fasteners 84 such as tension head Hi-Lok® fasteners produced by Alcoa, Inc., spaced between the longitudinal free edge 82 and the bend from the radially extending leg 78 to the outer longitudinal flange 80. While shown in the drawings as a circular scallop, the profile may be tailored as joined alternating semi-ellipses or as a saw tooth. In the exemplary embodiment in the drawings, the lip skin 24 is Al 2219 T-62 and the aft edge land 30, stiffeners 34 and central land 36 are approximately 0.125 inches in thickness while the inner edge land 32 is approximately 0.1740 inches in thickness with a nominal thickness of the skin web 25 of the lip skin 24 at 0.080 inches. The aft edge land 30 width is approximately 1.50 inches, the stiffener width approximately 1.50 inches while the inner edge land 32 width is approximately 1.070 inches. The forward bulkhead 60 is fabricated from Ti-6AL-4V having a having a thickness of 0.060 inch. The outer angle element is similarly Ti-6AL-4V having a thickness of 0.050 inch. The relative dimensions of the scallop or other profile is determined to provide a predetermined coarseness on the free edge which relieves relative stress in the longitudinal flange and attached central land 36 of the lip skin due to circumferential loads imposed by differing thermal expansion of the outer angle element 62 and central land 36.

Figure 7:
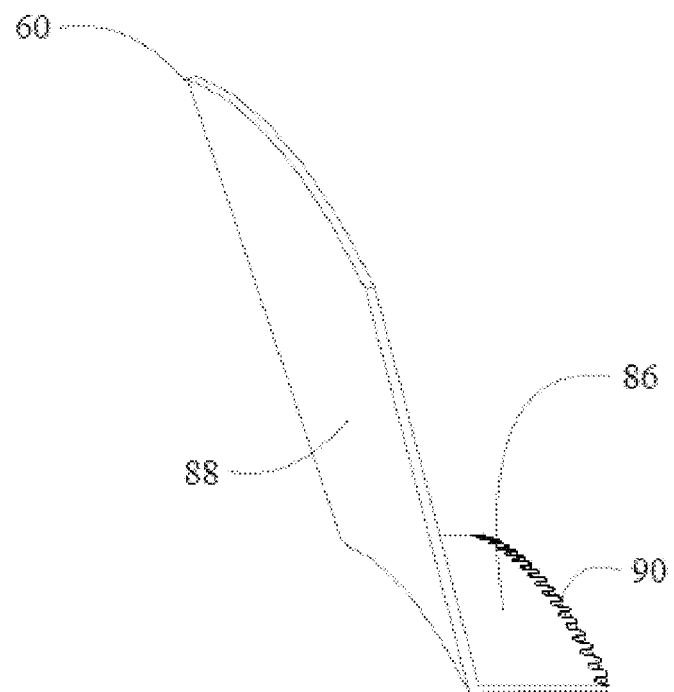
FIG. 7 is a detailed section pictorial view of the bulkhead and inner angle element.

Similarly for the inner angle element 64, shown in FIG. 5 as an integral portion of the forward bulkhead 60, an inner longitudinal flange 86 extends from a web 88 of the bulkhead. While shown as integral to the bulkhead in the described embodiment, the inner angle element may be a separate angle as described for the outer angle element. The lip skin 24 is attached circumferentially to the inner longitudinal flange 86 at the inner edge land 32. The lip skin 24, inner longitudinal flange 86 (and attached forward bulkhead 60) again have differing CTEs and therefore will have potentially differing expansion under temperatures experienced in the flight profile of the aircraft. In the configuration of the joint at the inner longitudinal flange 86, inner barrel 52 may additionally have a differing CTE which may further create thermally induced stresses. The inner longitudinal flange 86 has a second longitudinal free edge 90 shown in detail in FIG. 7. Similar to the free edge 82, the second longitudinal free edge 90 incorporates a scalloped profile to ameliorate stresses from thermally induced expansion differential between the inner angle element 64, the attached forward bulkhead 60, the lip skin 24 and additionally the inner barrel 52. The lip skin 24 is attached to the inner longitudinal flange 86 using fasteners 92 spaced between the second longitudinal free edge 90 and the bend from the web 88 to the inner longitudinal flange 86. Again, while shown in the drawings as a circular scallop, the profile may be tailored as joined alternating semi-ellipses or as a saw tooth. While scalloping of a free edge of both the outer and inner angle elements is shown in the embodiment of the drawings, either or both of the angle elements may employ the scalloped free edge.

Figure 6:
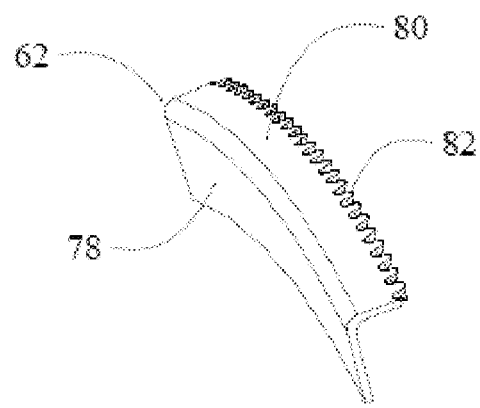
FIG. 6 is a detailed section pictorial view of the outer angle element.
Figure 8:
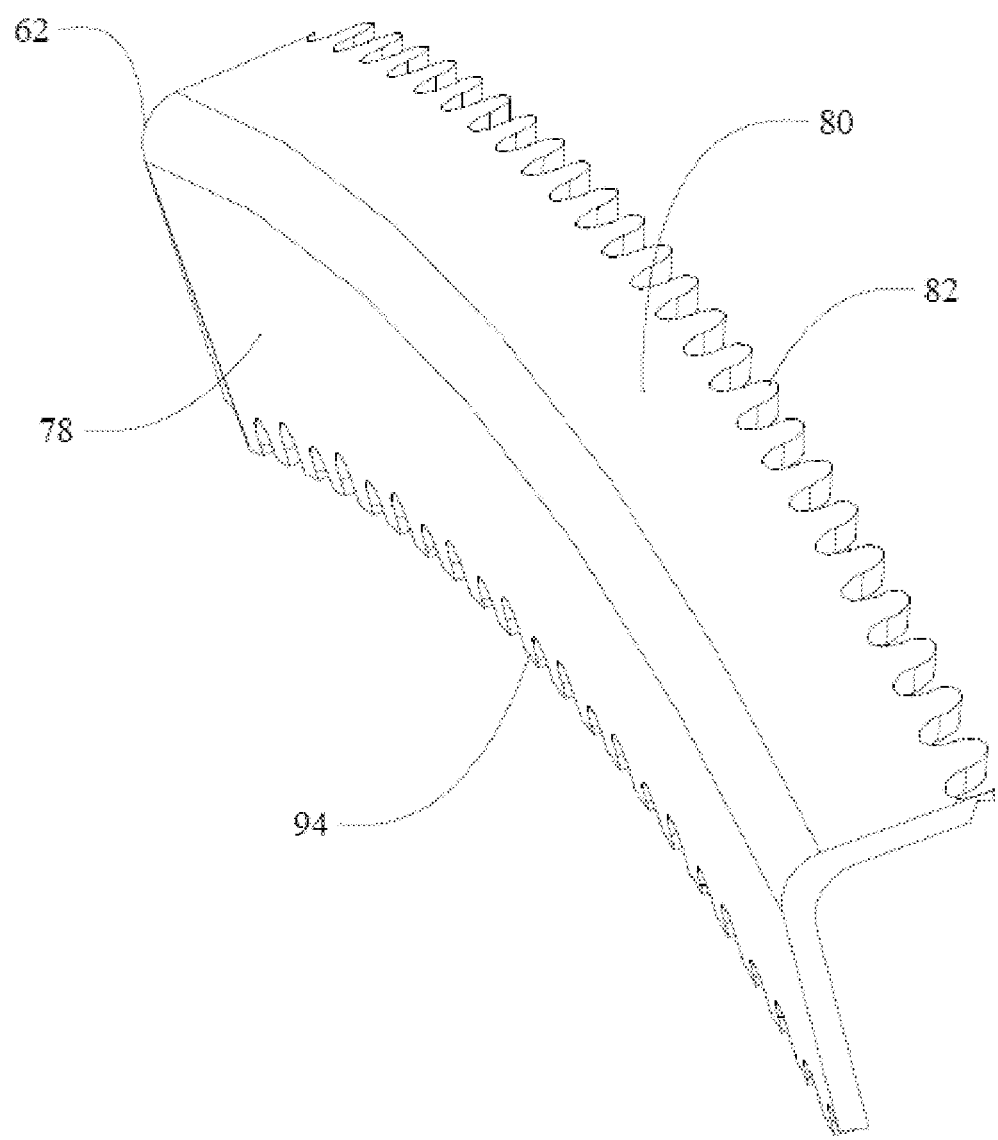
FIG. 8 is a detailed section pictorial view of an alternative embodiment of the outer angle element.

Additionally, for the embodiment of FIG. 6 with the outer angle element 62 implemented as a separate angle element, scalloping of a radial free edge 94 on the radially extending leg 78 as shown in FIG. 8 may also be accomplished to enhance the stress reduction from thermal expansion differential between the outer angle element 62 and web 88 of the forward bulkhead 60 when attached as shown in FIG. 5.

While described in the example embodiment for the inner and outer angle elements for attachment of the bulkhead, comparable scalloping of free edges on mating hoop structure elements such as the T-chord stringer 56, T-V chord stringer 70 or L bracket 74 may also be employed for thermal stress relief.

Figure 9A:
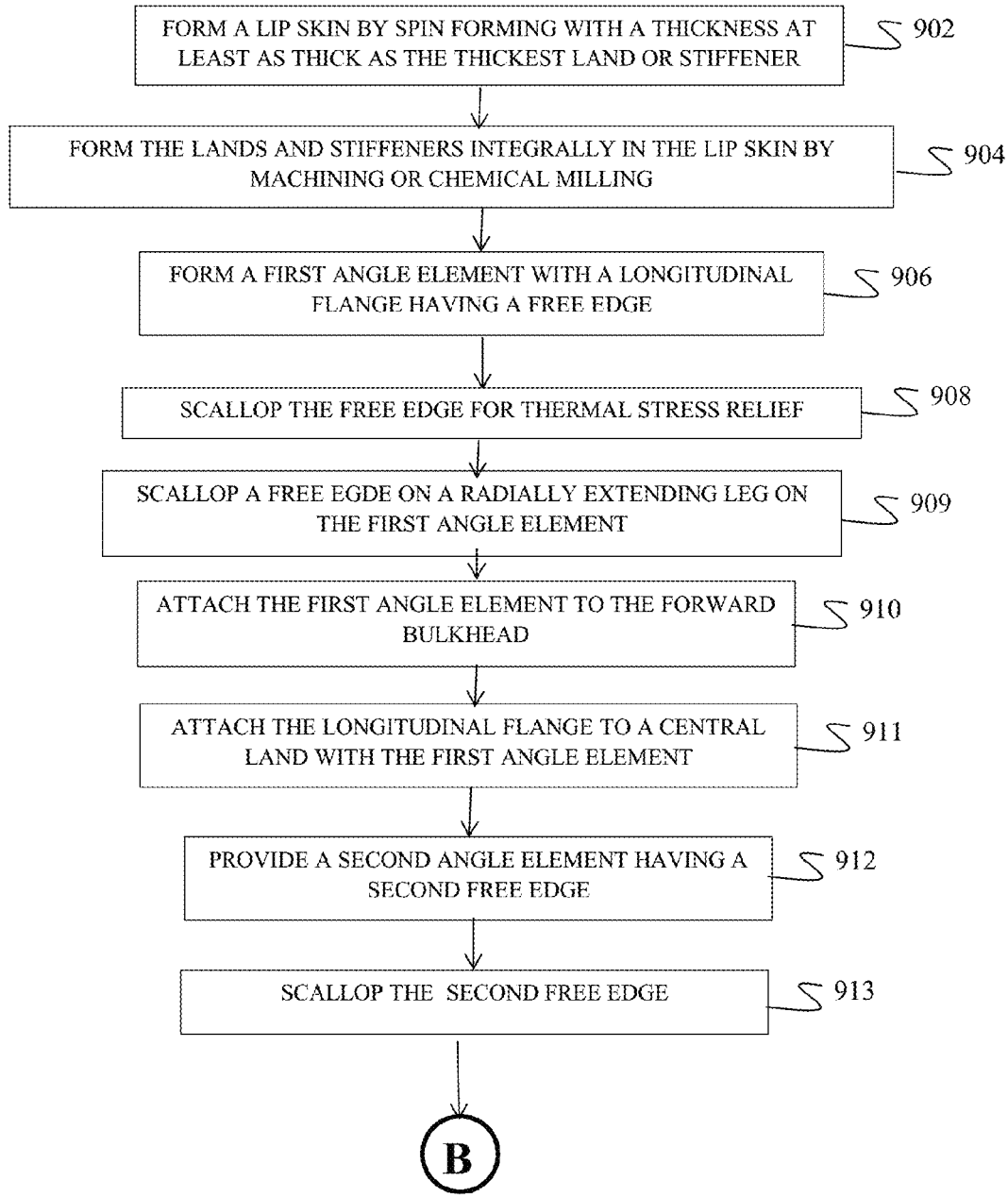
FIGS. 9A and 9B are a flow chart of a lip skin structural assembly method enabled by the disclosed embodiments.
Figure 9B:
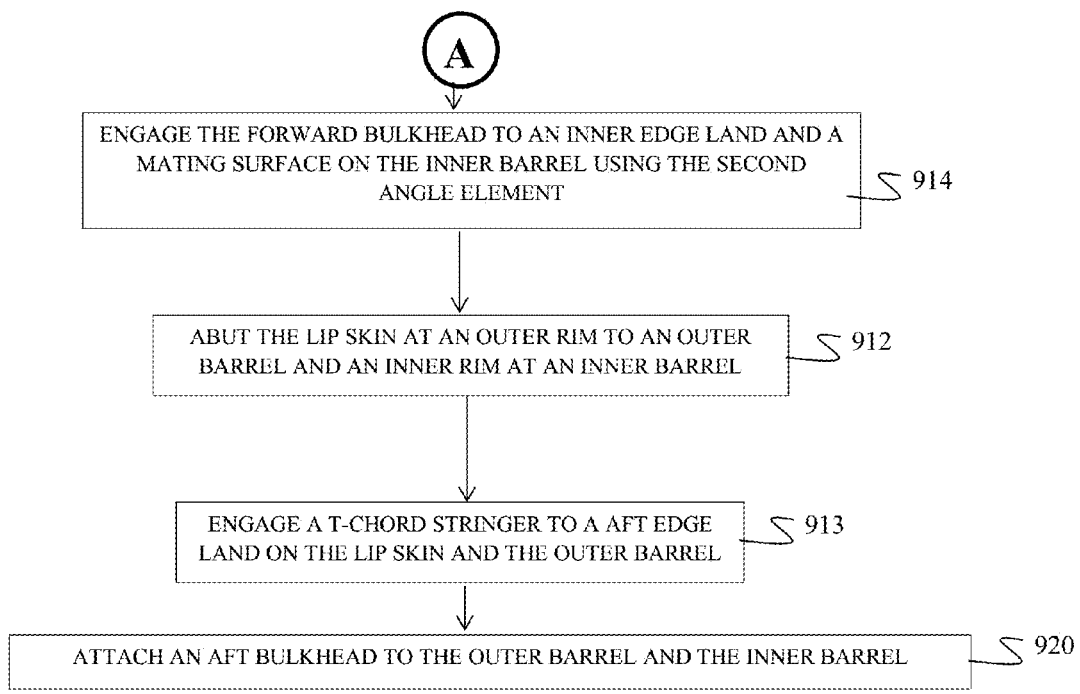

Fabrication of a nacelle inlet employing a one piece inlet lip skin as disclosed in the embodiments herein is accomplished as shown in FIGS. 9A and 9B. A lip skin is formed by spin forming with a thickness at least as thick as the thickest land or stiffener, step 902. The lands and stiffeners are formed integrally in the lip skin by machining or chemical milling, step 904. A first angle element, the outer angle element 62 for the embodiments shown, is formed with a longitudinal flange having a free edge, step 906. The free edge is scalloped, step 908, for thermal stress relief. The first angle element may additionally have a second free edge which is scalloped, step 909. The first angle element attached to a forward bulkhead, step 910. The forward bulkhead is attached to a central land with the longitudinal flange of the first angle element, step 911. The lip skin is abutted at an outer rim to an outer barrel and an inner rim at an inner barrel, step 910. A second angle element, the inner angle element for the embodiment shown, is provided having a second free edge, step 912, the second free edge is scalloped, step 913, and the forward bulkhead is engaged to an inner edge land and a mating surface on the inner barrel with the second angle element, step 914. The lip skin is abutted at an outer rim to an outer barrel and an inner rim at an inner barrel, step 916. A T-chord stringer is engaged to an aft edge land on the lip skin and the outer barrel, step 918 and thereby fastening the lip skin to the inner and outer barrels. An aft bulkhead is then attached to the outer barrel and the inner barrel, step 920.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A structural system for accommodating the thermal expansion of a nacelle lip and supporting structure, the structural system comprising:
    a lip skin;
    a first angle element having a first longitudinal flange extending from a bend with a longitudinal free edge distal from the bend, said free edge scalloped to accommodate thermal stresses, said first angle element attached to the lip skin with fasteners spaced between the longitudinal free edge and the bend; and,
    a bulkhead attached to the first angle element.

2. The structural system as defined in claim 1 further comprising:
    a second angle element extending from the bulkhead distal from the first angle element and having a second longitudinal flange attached to the lip skin.

3. The structural system as defined in claim 2 wherein the lip skin comprises:
    a skin web
    an inner edge land integrally extending from the skin web at an inner rim; and,
    a central land integrally extending from the skin web;
    the first angle element attached to the lip skin at the central land and the second angle element attached to the lip skin at the inner edge land.

4. The structural system as defined in claim 2 wherein the second longitudinal flange has a second longitudinal free edge, said second longitudinal free edge scalloped to accommodate thermal stresses.

5. The structural system as defined in claim 1 wherein the first angle element comprises:
    a radially extending leg extending from the bend.

6. The structural system as defined in claim 5 wherein the radially extending leg has a radial free edge distal from the bend, said radial free edge scalloped to accommodate thermal stresses, and said radially extending leg is attached to the bulkhead with fasteners spaced between the radial free edge and the outer longitudinal flange.

7. An aircraft nacelle comprising:
    a lip surrounding an inlet aperture, said lip having a lip skin with an aft edge land, a central land and an inner edge land;
    an outer barrel engaged to the aft edge land;
    an inner barrel having a forward edge land engaged by the inner edge land;
    a first angle element, said first angle element having an outer longitudinal flange extending from a bend with a longitudinal free edge distal from the bend, said longitudinal free edge scalloped to accommodate thermal stresses, said first angle element attached to the lip skin at the central land with fasteners spaced between the longitudinal free edge and the bend; and,
    a forward bulkhead attached to the first angle element.

8. The aircraft nacelle as defined in claim 7 wherein the first angle element further comprises:
    a radially extending leg extending from the bend.

9. The aircraft nacelle as defined in claim 8 further comprising:
    an inner flange on the forward bulkhead spanning the inner edge land and the forward edge land, said inner flange having a second longitudinal free edge, said second longitudinal free edge scalloped to accommodate thermal stresses, said inner flange fastened with fasteners spaced between the second longitudinal free edge and a web of the bulkhead.

10. The aircraft nacelle as defined in claim 9 further comprising an aft bulkhead extending between an aft end of the outer barrel and an aft end of the inner barrel.

11. The aircraft nacelle as defined in claim 9 wherein the first angle element has a radial free edge on a radially extending leg, said radial free edge scalloped to accommodate thermal stresses.

12. A method for fabricating an engine inlet comprising:
    forming a lip skin;
    forming a first angle element having a bend and a longitudinal free edge;
    scalloping the longitudinal free edge;
    attaching a bulkhead to the lip skin with the first angle element with fasteners spaced between the longitudinal free edge and the bend.

13. The method as defined in claim 12 wherein the step of attaching a bulkhead comprises forming the first angle element with a longitudinal flange having the longitudinal free edge and attaching the first angle element to the bulkhead with a radially extending leg extending radially from the bend.

14. The method as defined in claim 13 further comprising attaching the radial leg to a web of the bulkhead with fasteners intermediate the bend and a radial free edge.

15. The method as defined in claim 14 further comprising scalloping the radial free edge on the radially extending leg.

16. The method as defined in claim 13 wherein the step of forming comprises forming a plurality of lands integrally in the lip skin.

17. The method as defined in claim 16 further comprising:
    attaching the longitudinal flange to a central land formed as one of the plurality of lands; and
    abutting the lip skin at an outer rim to an outer barrel and an inner rim at an inner barrel.

18. The method as defined in claim 17 further comprising engaging a second longitudinal flange of the bulkhead to an inner edge land and a mating surface on the inner barrel.

19. The method as defined in claim 18 further comprises scalloping a second longitudinal free edge on the second longitudinal flange.

20. The method as defined in claim 17 further comprising engaging a first stringer to an aft edge land on the lip skin and the outer barrel.

* * * * *

UNITED STATES PATENT AND TRADEMARK OFFICE
CERTIFICATE OF CORRECTION

PATENT NO. : 9,764,849 B2
APPLICATION NO. : 14/489782
DATED : September 19, 2017
INVENTOR(S) : Stark et al.

It is certified that error appears in the above-identified patent and that said Letters Patent is hereby corrected as shown below:

On the Title Page

Item (72) Inventors, should read:
--RICHARD L. Stark, Mt. Pleasant, SC (US);
Ananthram Kota Shashidhar, Laguna Hills, CA (US);
Alejandro Silva, Rancho Santa Margarita, CA (US);
Hoa V. Truong, Irvine, CA (US);
Stuart Williams Voget, Long Beach, CA (US);
John Ybarra, Placentia, CA (US).

Signed and Sealed this
Seventeenth Day of July, 2018

Andrei Iancu
*Director of the United States Patent and Trademark Office*